US009665550B2

(12) United States Patent
Lee

(10) Patent No.: US 9,665,550 B2
(45) Date of Patent: May 30, 2017

(54) EXPERT BASED INTEGRATED ANNOTATION SOFTWARE INTERFACE AND DATABASE USING E-BOOK TECHNOLOGY

(71) Applicant: Michael E. Lee, Eugene, OR (US)

(72) Inventor: Michael E. Lee, Eugene, OR (US)

( * ) Notice: Subject to any disclaimer, the term of this patent is extended or adjusted under 35 U.S.C. 154(b) by 349 days.

(21) Appl. No.: 14/092,784

(22) Filed: Nov. 27, 2013

(65) Prior Publication Data

US 2014/0157103 A1   Jun. 5, 2014

Related U.S. Application Data

(60) Provisional application No. 61/797,154, filed on Nov. 30, 2012.

(51) Int. Cl.
  *G06F 17/24*   (2006.01)

(52) U.S. Cl.
  CPC .................. *G06F 17/241* (2013.01)

(58) Field of Classification Search
  CPC ....... G06F 17/24; G06F 17/241; G06F 17/242
  USPC .................................. 715/230–233
  See application file for complete search history.

(56) References Cited

U.S. PATENT DOCUMENTS

| | | | | |
|---|---|---|---|---|
| 5,524,193 A * | 6/1996 | Covington | ........ | G06F 17/30855 348/E5.104 |
| 5,802,539 A * | 9/1998 | Daniels | .................. | G06F 17/21 704/7 |
| 6,199,076 B1 * | 3/2001 | Logan | ............... | G06F 17/30053 434/319 |
| 6,611,828 B1 * | 8/2003 | Koleszar | ................. | G06F 19/26 435/6.15 |
| 6,732,090 B2 * | 5/2004 | Shanahan | ......... | G06F 17/30011 |
| 7,103,848 B2 * | 9/2006 | Barsness | ........... | G06F 17/30716 715/776 |
| 7,246,118 B2 * | 7/2007 | Chastain | ............... | G06F 17/241 |
| 7,401,286 B1 * | 7/2008 | Hendricks | ........... | G06F 17/2235 715/203 |
| 7,418,656 B1 * | 8/2008 | Petersen | ............... | G06F 17/241 715/230 |
| 7,971,136 B2 * | 6/2011 | Menachem | ........... | G06F 3/0481 715/230 |
| 8,126,878 B2 | 2/2012 | Krasnow | | |

(Continued)

*Primary Examiner* — Andrew Dyer
(74) *Attorney, Agent, or Firm* — McCoy Russell LLP

(57) ABSTRACT

A software interface to increase the efficiency of reading, learning, and accessing information about passages in a selected electronic text document is provided. Passages are "marked" by a selected expert. Marked passages may be used as part of a touch screen menu to access specific and edited resources. The menu may present options related to the marked passages including comments, web video (edited), website (edited) or other resources for study and research purposes.

Text Reduction (with) Annotation & Commentary (TRAC) provides a study/research tool that does not alter the text, allowing an e-book user to stay on one screen of an electronic reading device, and examine targeted and edited internet resources. Information generated in a structured way is saved in a database, which in turn will be capable of word and subject searches across e-book documents, or expanded searches related to critical and important materials in the TRAC document.

17 Claims, 6 Drawing Sheets

(56) References Cited

U.S. PATENT DOCUMENTS

| | | | | |
|---|---|---|---|---|
| 8,244,036 B2* | 8/2012 | Hartmann | G06F 17/2211 | 382/179 |
| 8,667,385 B1* | 3/2014 | Mui | G06F 17/241 | 715/205 |
| 8,755,058 B1* | 6/2014 | Jackson | G06F 3/14 | 358/1.1 |
| 8,892,630 B1* | 11/2014 | Curtis | G06Q 30/0282 | 709/203 |
| 8,977,953 B1* | 3/2015 | Pierre | G06F 17/2785 | 715/201 |
| 9,251,130 B1* | 2/2016 | Lynnes | G06F 17/241 | |
| 2002/0133464 A1* | 9/2002 | Ress | G06Q 30/02 | 705/51 |
| 2004/0194021 A1* | 9/2004 | Marshall | G06F 17/241 | 715/232 |
| 2005/0132281 A1* | 6/2005 | Pan | G06F 17/241 | 715/230 |
| 2006/0265377 A1* | 11/2006 | Raman | G06F 17/3089 | |
| 2007/0136657 A1* | 6/2007 | Blumenthal | G06F 17/241 | 715/201 |
| 2007/0150801 A1* | 6/2007 | Chidlovskii | G06F 17/2247 | 715/210 |
| 2008/0005064 A1* | 1/2008 | Sarukkai | G06F 17/241 | |
| 2008/0098294 A1* | 4/2008 | Le | G06F 17/241 | 715/230 |
| 2008/0168073 A1* | 7/2008 | Siegel | G06F 17/3002 | |
| 2008/0229185 A1* | 9/2008 | Lynch | G06F 17/241 | 715/230 |
| 2008/0288862 A1* | 11/2008 | Smetters | G06F 17/218 | 715/255 |
| 2010/0151431 A1* | 6/2010 | Miller | G09B 7/00 | 434/350 |
| 2011/0047498 A1* | 2/2011 | Hendricks | G06F 17/3089 | 715/776 |
| 2012/0218305 A1* | 8/2012 | Patterson | G06F 17/2235 | 345/652 |
| 2012/0240025 A1* | 9/2012 | Migos | G06F 3/0488 | 715/230 |
| 2014/0164901 A1* | 6/2014 | McDowell | G06F 17/30038 | 715/233 |

* cited by examiner

TRAC INITIAL LOOK ON SCREEN - HIGHLIGHTS

TRAC stands for Text Reduction (with) Annotations (and) Commentary. When the program is opened in an e-book, (or any e-text) the initial appearance is color highlighting portions of the text. Portions of text marked in yellow are the "critical" sections as determined by an expert. Sections of text deemed to be "important" are deliniated in perhaps light blue highlight (in this embodiment). 92

<u>Thus, the initial view is that of a summary of the work, and a deliniation of those parts not only important, but that have links and further commentary attached.</u>
The user just touches the highlighted text to be taken to a menu specific to that text. That menu offers touch screen choices that offer more information on the text section chosen. The first item is a link to commentaries written about this particular text section. One commentary is short (under 200 words) for example, and the other commentary is longer than 200 words up to some determined limit.

<u>Other menu choices take the reader by hyperlink to net resources that have been chosen by the TRAC expert and edited for time and content.</u> The initial view of color highlights may be replaced by any number of test delineators such as underline and italics, all caps, and any number of font choices. <u>This type of text marking is also used in the links to internet resources that may be marked in color highlights or with the use of other markings like italics and underline.</u> 94

In addition to the menu choices of "comments" and "links" to internet other menu choices include a link to a designated library and the resources there, to "home page" resources related to the text at hand.

FIG. 3

EXPERT BASED INTEGRATED ANNOTATION SOFTWARE INTERFACE AND DATABASE USING E-BOOK TECHNOLOGY

CROSS REFERENCE TO RELATED APPLICATION

The present application is a non-provisional of and claims priority to U.S. Provisional Application No. 61/797,154, filed Nov. 30, 2012, the entire contents of which are hereby incorporated by reference for all purposes.

FIELD

This invention relates generally to the field of programs and resources for electronic devices for viewing books and written materials, and more specifically to a software program and database configured to assist a reader to easily access materials related to specific marked sections of text as a learning tool and for professional and research use. As the number of e-books subjected to the system increases, information grows and forms a specific standardized database allowing searching across documents and a variety of new search possibilities.

BACKGROUND AND SUMMARY

E-books and digital books, as versions of paper books, are becoming more common every year in spite of some objections and resistance to use. It has been recognized that e-book technology presents some advantages over print on paper, and these advantages are starting to be developed as the number of e-books increases.

E-text can be transmitted to computers and more recent e-book devices made for the specific purpose. E-book devices allow readers to purchase books or any text online or through alternate electronic means and may differ in formats determining what other manipulations of data are possible. One popular current format is HTML, the language of most web pages. Also there is AZW, the AMAZON format, and a number of others. These devices allow information manipulation without changing the text in any way. Features include the ability for users to highlight or underline text, to mark pages with "bookmarks", and to add footnote-like commentary.

Also, in some current examples, embedded hyperlinks can be inserted, and information can be displayed showing the most popular underlinings or highlights of all readers, such as the most marked sections.

Other features in some current readers include features that are imbedded with the transmitted text such as a touch feature to define words, with direct link to WIKIPEDIA for term definitions. In still other examples, terms and people mentioned in the book are statistically summarized and charted. Also links exist to see book reviews. These are built-in features as opposed to tools that a reader can use to actively perform some action, such as note taking. Thus, features or built-in features are of two types: those that are user tools, and those that present pre-loaded information or searches.

The current disclosure is directed to "add on" programs to e-text of two types of systems, those that create an "editing interface", and those that add an "informational" or "enhancement" type interface.

The "enhancement" systems create an "enhanced" book, offering more and more about any part of the book, often the diagrams or pictures. Textbooks are the books that benefit most from this enhancement. In such examples, a picture may become scores of pictures with the touch of the hand. A picture may show a video and an icon may allow one to listen to music when reading about it. INKLING is developing textbooks with this format at lower, not higher, prices, and the process creates the book from the start rather than being an add-on to an existing book. INKLING is an example of a system that expands the amount of information that is loaded by choosing a topic or picture to enhance. Such a system may operate to enhance text books and children's books in the pursuit of enhanced reading. For example, this type of system competes with the paper version, being a different type of text book. E-book technology also allows sales of individual chapters of text books without buying the whole book at one time. This technology is especially useful in the development of textbooks and children's books.

Essentially, enhanced books offer ever more information in a "book" format by adding video and audio features, along with the ability to manipulate figures by expanding and even rotating them. Enhanced books also facilitate word definitions and links to encyclopedias like WIKIPEDIA.

The other basic type of program for e-text might be called an "editing program"or "social reading" when the notations and ideas noted are shared with others. Such a system may have a home page to facilitate communication amongst readers. The programs allow highlighting of text, making marginal notes, and making collections of notes taken as one would do in the margin of a paper book. COPIA is an example of this type of add-on system to e-text. The ability to use video is shared with "enhanced" programs but a quote from the web page titled "Live in the margins" is descriptive as it reads, "Copia, a social eReading platform, connects you and your friends inside the books you need. Buy books, take and share notes, start study groups, join discussions, and read better together. All inside the margins."

Other prior systems exist such as U.S. Pat. No. 8,126,878 to Krasnow entitled "Academic study tool utilizing e-book technology" which is a software interface to increase the efficiency of reading, abstracting of information and locating material within an electronic publication, pursuant to which author content and/or researcher content may be quickly searched, addressed and stored on an academic tool utilizing e-book technology. This system is similar to the reader-initiated type discussed above, relying on the note taking of the reader along with reader-generated annotations. As described in the patent, "This invention relates generally to the field of portable devices for viewing books and written materials, and more specifically to an apparatus configured with software for assisting a reader to abstract and organize information as a learning tool and/or for professional use."

As described in more detail herein, the inventor has devised systems and methods which address the issues which limit the current systems. The disclosure described here is not simply an encyclopedia of more and more information added as annotation. Nor does the disclosure simply facilitate the note taking and organization of user-generated materials or promote what is known as "social reading". These things may be desirable in limited situations such as textbooks or in interactive and entertaining children's "books", however these prior systems operate to promote new ways of introducing video and audio and not so much to support the underlying text but instead replace it. Similarly, it is desired to have a system which goes beyond the current statistical analysis of the text as in AMAZON'S X-Ray technology (that keeps track of characters in books and how often they are mentioned) or systems that simply underline text that is the most popular text most underlined by readers.

In contrast to these prior systems, in one example, the inventor discloses a system that works with e-text that is "text" already in existence, such as many of the readings required in college, or regular books making up the majority of reading that people actually do. In one example, a Text Reduction with Annotation and Commentary System (TRAC) is disclosed. TRAC, in one example, pre-loads information that can be accessed by a user in specific ways. Information comes from specific "experts" but is standardized to make it comparable with multiple TRAC assisted e-books. For example, it is possible to download two TRAC programs for use on one book at the same time. This allows comparisons existing side-by-side on the same page.

TRAC extends beyond the expansion of information using e-book technology with hypertext to add in layers of general additional information along with sounds and video. As described in more detail herein, in one example, TRAC follows the method of information loading which is characterized as: (Limit->Enhance->Limit->). Given this, a user is guided through touch-screen technology (or other similar technology) to the precise edited resource needed at the time without leaving one program or device and doing a search. Unlike systems that just produce more and more, TRAC provides more and more about less and less. The user makes this choice by choosing marked passages where more information is needed. After this, the menu allows choices and descriptions of just what is available. What is available has been pre-loaded and pre-limited by expert editing. One goal of this method is to provide more about very specific questions contained in the limited marked passage linked to the menu choices.

TRAC further extends beyond the user-initiated system which are used to take notes, mark passages, share notes, or engage in "social reading". These prior systems provide self-editing tools so the reader can add notes or annotations or organize notes. These notes are shared if desired to form a kind of social reading. In contrast TRAC does not do this, and the only actions taken using TRAC are to initiate a touch screen (or other input screen) to lead the user to more edited information about a limited topic. For example, the information may be limited by the highlighted passage that the expert has marked, and, further, in some examples, expanded by the links that show more about this "less".

In another example, TRAC follows the model of a tutor interacting with a learner. In this example, the "expert" here is not to be confused with "computerized-expert systems" that try to develop computer responses that are "human like" and generate novel responses. In this way, TRAC should not be confused with systems that do a text analysis of an e-book with statistical counting. The TRAC system does not rely on profiling of the data regarding about how many times a word is used, or where characters appear in the document.

In yet another example, not only does TRAC follow the "tutor" model of interaction, it may include a database for TRAC information over time. Given the standardized data collection methods, information may be accessed through key word and TRAC home page searches to retrieve TRAC information across e-books and disciplines.

In this way, TRAC digitally may mimic having a human expert tutor at hand to limit the topic and focus, and then to expand on that focused material with edited (limited) new materials for clarity. The database resulting from the TRAC methods may be considered to be like having a tutor with a great memory. Similarly, in some examples, TRAC may provide access to other experts and the ability to ask such experts specific questions and answer in a disciplined way that sticks to the subject.

In some further examples, TRAC may be considered a digital software interface with e-book technology that is based on human expertise that can be collected and distributed in a way whereby the user only selects material when needed, and that material is not just more, but is specific to the user's need.

As described in more detail herein, it should be appreciated that TRAC provides an enriched study and research tool which is more than an editing tool or an "enhanced" source of multi-media presentation. In other words, TRAC provides a digital tutor guiding a learner through text in the most efficient manner possible. TRAC aggregates the advantages of a tutor and, in some embodiments, a database capable of understanding the contents not of just one book or e-document, but the relation of that understanding to all other works subjected to TRAC.

The above advantages and other advantages, and features of the present description will be readily apparent from the following Detailed Description when taken alone or in connection with the accompanying drawings.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF FIGURE DESCRIPTIONS

FIG. 1 schematically depicts an example embodiment of a system and components of a Text Reduction with Annotation and Commentary System (TRAC) system in accordance with the current disclosure.

FIG. 2 schematically depicts a method to standardize the expert information for use in the TRAC system.

FIG. 3 illustrates an example screen shot of a TRAC display in accordance with the current disclosure.

Figure 6:
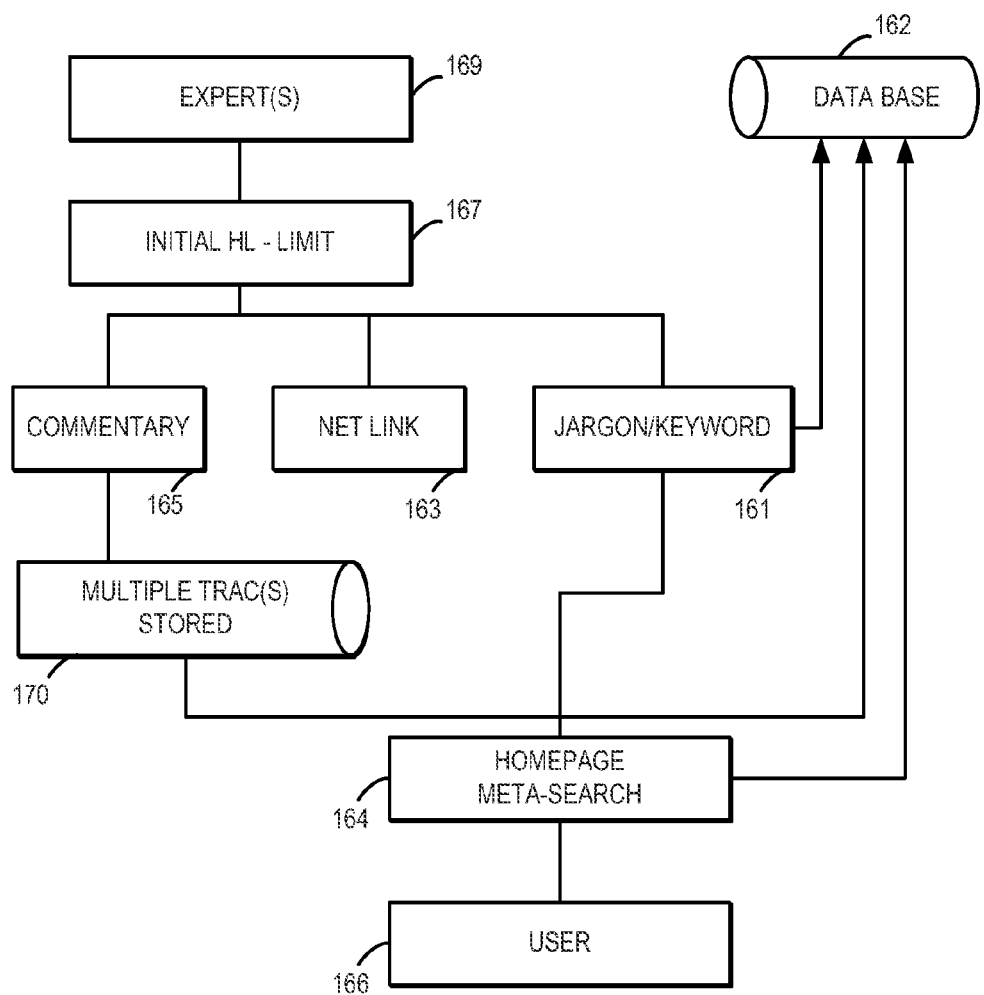

FIG. 6 schematically depicts an example system for META-TRAC in accordance with the current disclosure.

It should be understood that the drawings are presented to illustrate the principles of the invention. Further, it should be understood that the described arrangements in the figures and detailed description are only illustrative of the application of the basic principles of the present disclosure. Numerous modifications and alternative arrangements may be devised by those skilled in the art without departing from the spirit and scope of the present invention. The appended claims are intended to cover such modifications and arrangements.

For the purpose of promoting an understanding of the present disclosure, it should be understood that no limitations on the scope of the invention are intended by describing these exemplary embodiments. One of ordinary skill in the art will readily appreciate that alternate but functional equivalent components, formats and technology may be used. The inclusion of additional elements may be deemed readily apparent and obvious to one of ordinary skill in the art. Specific elements described herein are not to be interpreted as limiting but rather as a basis for the claims and as a representative basis for teaching one of ordinary skill in the art to employ the present invention.

DETAILED SPECIFICATION

Figure 1:
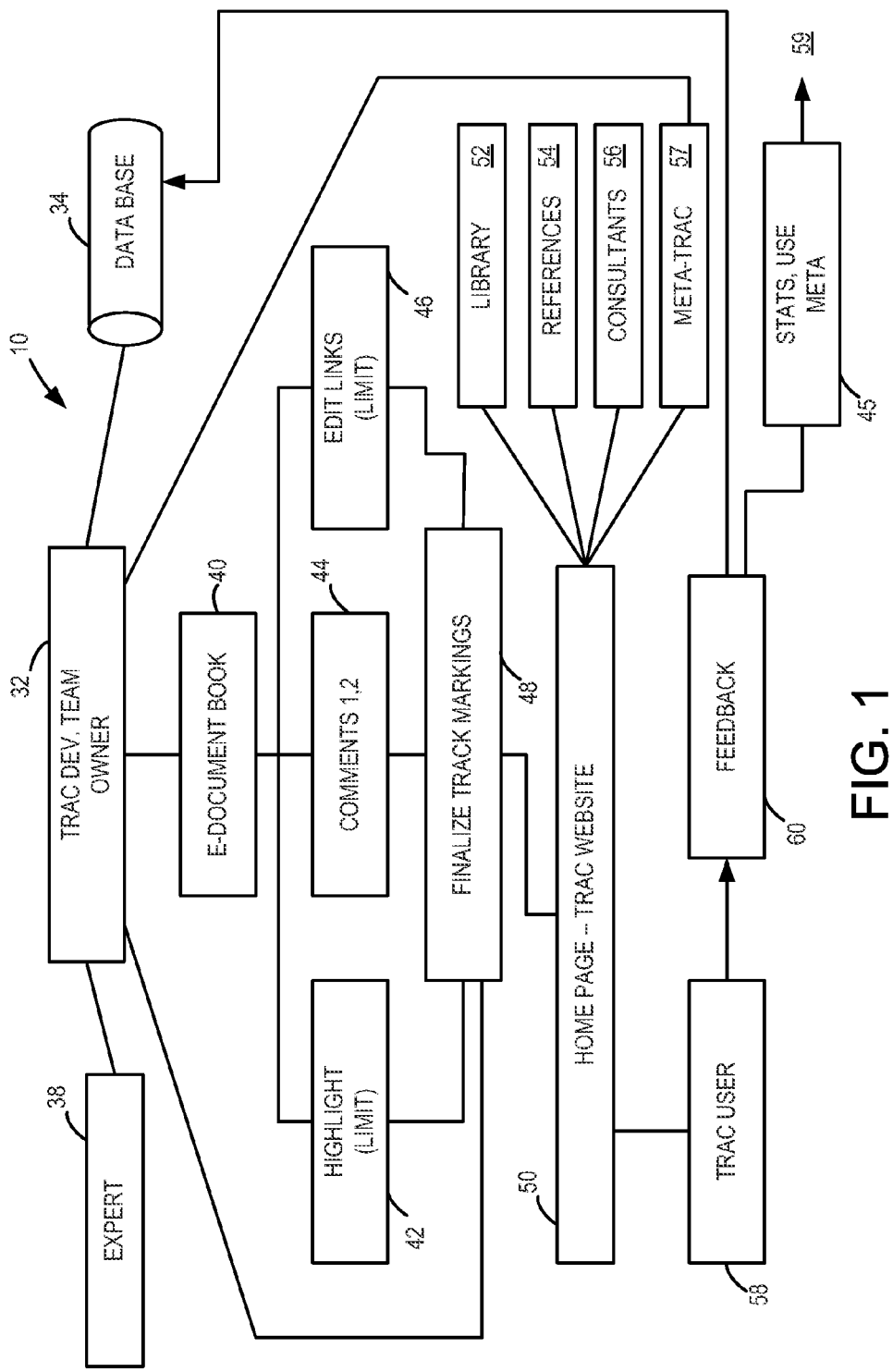

The following description relates to systems and methods for Text Reduction with Annotation and Commentary (TRAC), such as the TRAC system schematically depicted in FIG. 1. The TRAC system, in some examples, may include methods and systems for standardizing data collection expert answers, as outlined in FIG. 2. User interfaces for using TRAC are shown for example purposes in FIGS. 4 and 5. Finally, in FIG. 6, a system for META-TRAC displays is illustrated.

It should be appreciated that the system may be executed on networked computing devices. Specifically, a first terminal or computing device (having a processor and memory) may be considered an expert computing device which may be networked or otherwise linked to a TRAC engine. The TRAC engine may be a separate computing device and may include a processor and memory and may be coupled or linked to a TRAC database. The TRAC engine may further be communicatively linked to a user or reader terminal or computing device (having a processor and memory). The linkage to the TRAC engine may be through a network, and may be accessed via a network browsing application such as a web-browser on the user computing device. The communication network may be a public network, such as the Internet, or a private network. The system considers both wireless and wired connections.

FIG. 1 shows the system and components of a system for Text Reduction (with) Annotation and Commentary (TRAC). The acronym is incomplete and only stands for a convenient name. Other words such as e-text technology, expert, hypertext, and internet links were not included in the short name but also apply to the disclosed software system for learning, research and study. As used herein, TRAC includes a method having an "expert" delineate e-book text sections critical to understanding an "e-book", then writing comments and editing links to internet sites. TRAC may further include, in some examples, marking key words and jargon. The components of TRAC include a software interface with e-text and a database.

In one example TRAC system, such as shown at 10 in FIG. 1, a development team 32 is established to produce TRAC for multiple "e-text" or "e-books". Hereinafter the term "e-book" will mean any book, article, paper, study or reference material, web-based content, presentation material, journal article, electronic or printed documents and media, and electronic text in any format. The e-book may include, for example, ASCII and/or any other text and/or written electronic material or any text or written material converted to e-text. In this way, any text that can be published and printed as a discrete published piece of text, and converted to e-text may be considered for the purpose of this disclosure as an e-book.

As an example, the development team may have determined which e-book to TRAC based on book sales or some other criteria. In some examples, the development team may include, in TRAC production, the owners and producers of a TRAC system who hire experts and own e-book rights. The development team may further be considered, in some examples, as a team that edits and modifies the answers given by "experts" in TRAC development, responsible for standardization. As a further example, the development team may include those maintaining a TRAC database and home page in large TRAC development.

The development team may have a large capacity database 34, and access to the internet or other network to run a business selling software, applications and other programs via the network. Multiple e-text documents (e-books) may be "TRACed" with the standardized program for the final phase of data base production to proceed.

Figure 2:
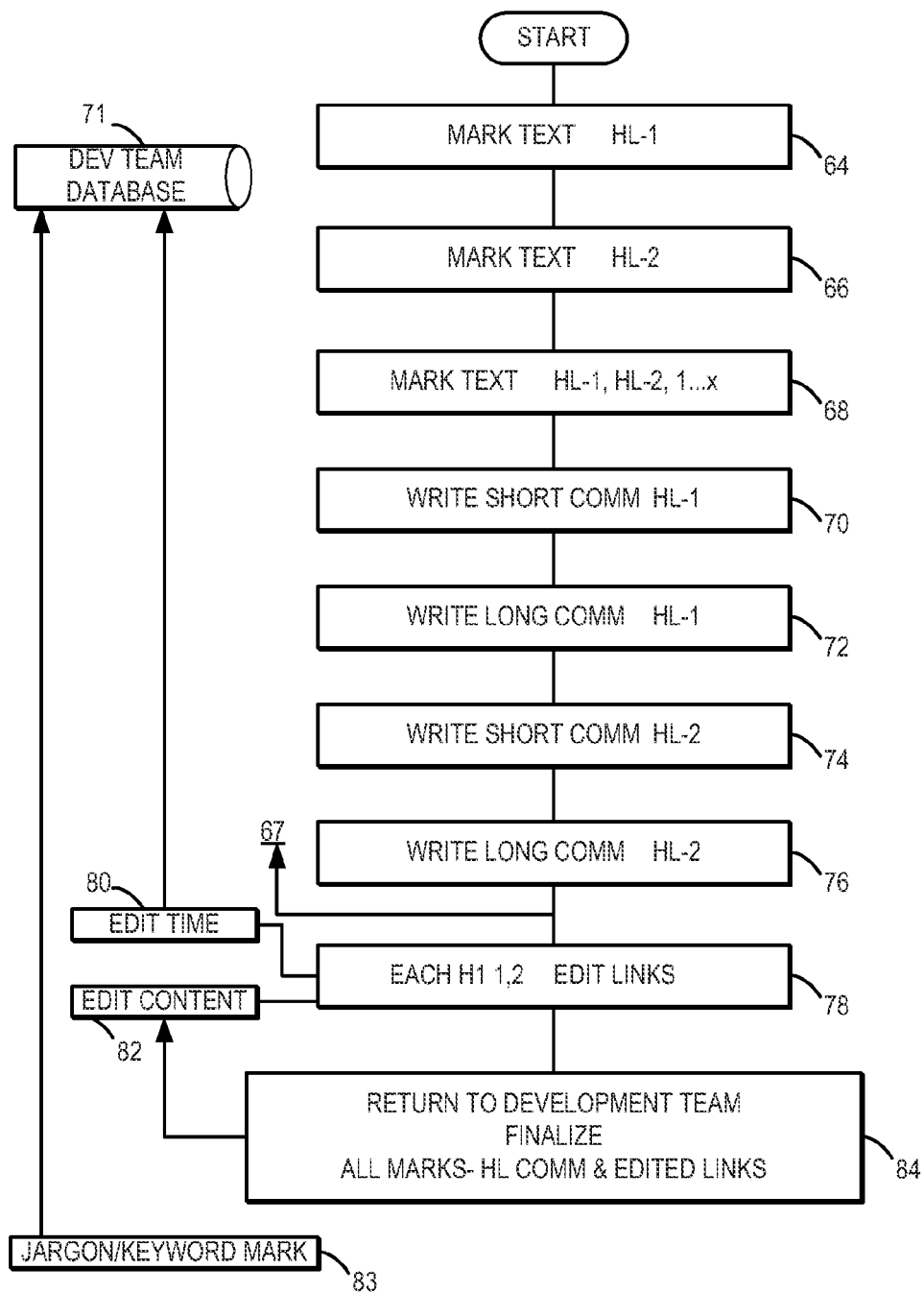

As described in more detail in regards to FIG. 2, in some TRAC systems, an information collection program may be used to elicit information on a particular e-book from an expert. The information collected (including limiting text, then producing comments, links, and key words and jargon from the field) may then be included in a program designed to provide learning and research as a user reads a TRAC-enabled e-book.

In some examples, TRAC software may be initially used to obtain information in a standard format from defined experts. After stages of filling in the answers, the development team may edit or otherwise review to insure the information and data received from the experts meets the standards. The delay of the final database does not interfere with the production of TRAC information applied to individual e-books. It is the accumulation of this data, in some examples, that may populate the associated database.

Referring back to FIG. 1, an "e-book" 40 has been chosen to be converted to e-text, or if already converted, to have TRAC developed and applied as a software interface for that particular text document.

Although illustrated in FIG. 1, it should be appreciated that the development team 32 may employ an expert 38. Such example, of use of the expert, in the field that the e-book is published is not intended as a limitation, but is shown as an example for purposes of database creation. As used herein, the expert may be anyone who fills in a TRAC instrument. In some examples, a true expert may be a person chosen (hired) or otherwise choosing to fill in the data for a TRAC software system with "Marks" such as highlighting, commentary, editing internet links, and listing Jargon/Key Words. The expert may be considered the teacher half of the dialectical relationship of tutoring. Although generally experts are described herein as a human reviewer, in some examples, the expert may be automated.

In FIG. 1, a paid expert may be selected and guided through an electronic program defining the kinds of information needed from him/her to complete a TRAC instrument. This TRAC instrument may be transmitted electronically (upon user direction, automatically, or semi-automatically) according to such systems and methods for submission of e-forms and questionnaires.

The expert may engage in a number of tasks, including but not limited to highlighting 42, comments 44 and/or editing links 46. The expert may be considered to "mark" the text. As used herein, mark may include delineated text and writing by the "Expert". Highlighting or any of a number of delineations not changing the text, such as: underlining, caps, italics, bold, different fonts, etc. may also be considered as mark or markings. Further, in some examples, commentary on text and editing links along with key words may be considered mark or markings.

In the illustrated example, the expert tasks involved may begin with text reduction or highlighting 42. This task may be accomplished by highlighting text defined as "critical" in one color, and highlighting text defined as "important and supporting" in another color. Any "marking" that distinguishes text, such as underlining, italics, caps, or font type may replace color as the distinguishing mark or indicator.

The expert may be allowed wide freedom but the expectations may be made clear in the collection program along with parameters of expected length of answers and length of highlights, etc. The development team may have the final say as to content after editing and may own the rights to the new information. In some examples, the expert may be a social networked group or other group, either preselected or self-selected, where the content may be peer-reviewed or group reviewed instead or in addition to the development team review. In the current illustrated embodiment, it is shown that at each stage of production the product (the TRAC instrument) may be sent to the development team for approval before proceeding through the tasks 42, 44, 46.

Continuing with the illustrated example, when the expert has gone through the entire e-book highlighting one color (e.g. yellow) for all critical material in her mind, and highlighting (e.g. in blue) all supporting material, these highlights (HL) may be consecutively numbered, and referred to as HL/C 1 . . . X, and HL/S 1 X. (Highlight "Critical", and Highlight "Supportive and important"). In some examples, the limiting highlights are linked to a number and a short name for later database formation as described in regards to FIG. 6.

Such highlighting may continue until all highlights are defined and given a number and a short name, as indicated at 48.

A second task for the expert is the comment task 44. The comment task may include, for example, the expert writing two versions of a commentary explaining the highlighted sections. The first commentary may be considered brief and may be defined under a pre-set word limit, e.g. under 200 words (for example). In some embodiments, a second commentary for a particular highlight may be a longer commentary (or more detailed commentary). For example, the second commentary may be over 200 words. This second commentary may also have a preset limit (e.g. 800 words). Again, at this point, in some examples, the expert may be instructed by the program to submit the commentaries to the development team for approval and final agreement before proceeding.

A third task 46 for the expert may include (in some examples) a task directed to examination and editing of materials available on-line. For example, the expert may link to a network, such as the internet, including URL websites, video media, lecture and educational material, etc., as it relates to each of the numbered highlights. If possible each HL/C and HL/S may include at least one link to a networked source or media content, such as from the internet. In other examples, a robust TRAC may include several links for most or all HL sections. The links may be edited for time and content and the link may be hypertexted on the menu available to the user. It should be appreciated that the links themselves may be reviewed at select intervals and automatically, semi-automatically or manually updated and/or amended or revised.

In some examples, a TRAC production program may instruct and aid the expert in editing of sites chosen for immediate linking to be available in the final TRAC software. Thus, some sites with relevant video lectures such as TED lectures and others, may be edited for time. In such examples, the expert (and/or team) may review to ensure only the relevant parts of the video are shown in order to save time and be effectively viewed. Other internet websites may be selected and/or edited for content by using the highlighting technology described above.

At 48, following completion of the task(s), using program guidelines and editing (highlighting), the expert may then submits the chosen sites for final approval, such as final approval of the development team 32.

With text reduction finished, commentaries written, and internet links edited, the development team may be able to add this TRAC software to the dedicated home page, indicated at 50. It should be appreciated that review of the development team may be automated, semi-automated or otherwise managed to enable efficient posting to the TRAC website.

In the illustrated embodiment, TRAC may manage and operate the home page—TRAC website. The homepage website may include some or all the TRAC software available. In some examples, the TRAC homepage may provide directly or through a link prices to download to e-books with and without TRAC.

The homepage may also be used to maintain helpful services for TRAC purchasers linking their e-text with TRAC user. For example, the homepage may link to a designated library or research collection 52, other references found on-line 54, consultants 56 (e.g. a listing of paid consultants who work in the area or have other credentials or qualifications.)

In some examples, an additional task or final standardized task may be performed by the expert is to note all words in the highlights that are "jargon" or technical or specialized words specific to the field. As used herein, key word, also referred to as jargon, may be any words or combination of words in text marked by experts as unique to a field or body of text. Words associated with a marked section of text may be used later in searches, or to identify the text.

Such jargon may be marked and noted. (e.g. made bold in this embodiment). In some examples, the jargon may be useful later for searches and form a way of linking and establishing relationships between e-books across fields and disciplines, as indicated generally at 57 in regards to META-TRAC.

In one embodiment, the website may provide a link to the TRAC software, users and purchasers of TRAC download from the website the software itself, being the highlights, comments, and links that now appear along with the e-text. It should be appreciated that the markings and links do not modify the underlying text. The user 58 and buyer of TRAC may download TRAC to an e-book. In the disclosed TRAC system, copyright text is not changed or modified with TRAC software, only "marks" are done in the form of highlights—these being interchangeable with other ways of designating text such as underlining, use of italics, bold, font changes, all caps, size changes, etc. How text is designated for various purposes of limitation is interchangeable.

It should be appreciated that multiple TRACs may be provided, purchased or otherwise available for a single e-book. A user may select to display one or more TRACS with the e-book. If, for example two TRACs were purchased for the same book by different experts, the highlights for one would be designated a first mark type while a second mark type would be used for the second TRAC (e.g. underline and caps).

It should be appreciated that the embodiment detailed above is one example of TRAC use, and another example may be on a smaller scale with a professor or teacher using TRAC software to develop a tool for students to use, either in a distance learning situation, or in a normal classroom. The "expert" in this case may be the teacher, filling in the TRAC information on documents from the class, his book, or any book or text document used in the course.

Between the two extremes of a corporate software add-on system to e-book sales and the teaching tool in class are a number of embodiments. All are dependent on the basic TRAC method however.

It should be appreciated that in some examples, the development team (owners) may maintain a website dedicated to TRAC books and users may have access to the portion dedicated to the TRAC they order and use. In such an example, information may be exchanged between developers and users. The homepage 50 may include useful features to support such use of TRAC. For example, the TRAC homepage may include a section for each book containing TRAC software. There users of TRAC may find references, lists of papers written about the current TRAC, discussion groups, the ability to post comments, etc.

Further, in some examples, the TRAC home page may include a feature to enable users to leave feedback as to how to improve TRAC for a particular book, as indicated at 60. Such feedback may be integrated for future development, and in some examples, users may be remunerated to encourage suggestions and comments.

As the number of TRAC book increases to a critical number, it may be possible to develop a large maintained relational database linking TRAC books by subject, key word, author, discipline, concept, etc., such as the META-TRAC at 57. Eventually as the number of TRAC e-books grows in a particular field this relational capability will be a valuable service to be sold and may provide a learning and research tool for users.

As an illustration, TRAC development may proceed as an auxiliary service. For example, a company with the resources for a development team (like AMAZON) may be able to incorporate an auxiliary service to attach to e-books. For example, an auxiliary service integration example is provided with Whisper sync. In a sense, Whisper sync is a voice reading a book, but in the development, it provides a complex tool to integrate into the e-book system. The voice matches the page and even line so it is integrated and synced within a software system enhancing the value to the existing e-book.

Turning now to FIG. 2, a standardized data collection program for expert answers is illustrated for use in one example of the TRAC system herein. As illustrated, FIG. 2 shows the instrument used to standardize the information supplied by the particular expert on a particular e-text book (e-text document of any kind). The instructions may be sent via computer through a network. The expert may mark or highlight text "critical" passages as indicated at 64.

These passages highlighted are called (HL/C) for the purposes of this example. The expert may proceed through the entire e-book (or some portion thereof) and may simply highlight those sections he/she believes are of critical importance. Each section in turn, may be assigned a number, being HL/C 1 . . . X in a serial manner to the end of the document. This process is considered "marking" the text and may be highlighted electronically with a stylus or computer key. For this illustration, and not as a limitation, the color yellow may be used to mark the critical passages. It should be understood that marking may be done with any number of methods that delineate text such as underlining, caps, italics, etc. All are equally useful and may be pre-selected by the expert or the program to indicate a specific expert or as a general expert indicator. As noted above, more than one marking may be used when more than one TRAC is attached to an e-book document. If two TRACs are loaded to one document both cannot use the same color to designate critical text, since overlapping could result in difficulties differentiating the markings or otherwise cause a problem. As such, alternate markings may be used, for example, color and underline may be compatible to indicate critical passages both marked by different TRAC experts.

In a similar manner passages deemed to be "supportive or important" are marked by a second marking type (e.g. second color, in this instance light blue). Again, this marking could be any mark to delineate text sections. (HL/S 1 . . . X). It should be appreciated that the text itself is never changed by TRAC.

Again referring to the example illustration, the highlights may be visible as colored sections of text and may be numbered from 1 to the final number of highlights, sequentially. The highlights may appear on the e-text and may be assigned numbers for identification along with a short name for each 68. It should be appreciated that other indicators may be sued to provide notice to a user of markings for specific text.

From this point, in some example TRAC systems and methods, with the "critical" and "important and supportive" sections marked, numbered and named, the other portion of the text in the document may be substantially ignored. The program focuses primarily, in regards to this example of TRAC, to the marked text sections and their number 83.

As briefly described in regards to FIG. 1, following the first phase, the program may instruct the expert to begin writing defined sections of comments on each highlight in turn. 70,72,74,76. For each highlight, a short (200 words or less for this example) commentary and a long commentary (300-500 words) in this example may be inputted. It should be appreciated that only a single commentary may be used or any other multiple numbers of commentaries may be provided. Further, the required length of short and long comments on a section of text (HL) may be variable and may be decided upon by the development team or any "expert" doing a TRAC based on the type of e-book text at hand.

In this example, the commentary is described as from the expert to explain the marked section: why it is critical or important and provides more text to explain the marked section. This commentary writing may be done for each numbered highlight (e.g. in the illustrated example, both short 70 and long 72 comments are written).

In some examples, with the comments completed (e.g., sent to the development team and approved or modified), the TRAC instrument may prompt the expert to go through each text section, one at a time and list "links" (usually internet accessible) that may be useful in understanding that particular text. The software may allow editing of an internet site for content (text reduction) 78, 82 and time 78, 80. For example, if the link is a video of a lecture or video of any type, the expert may edit the download for time, perhaps only selecting a specific 5 minute section of a 45 minute lecture. For links that are internet sites, the expert may use the highlighting method to mark "critical" and "important" parts of the site with highlighting. For each site a URL address may be provided for the development team indicating where the edited site is located. Such links may provide the basis for touch screen technology that will be accessible to the user of the software.

Next, the expert may proceed through the e-book text and "mark" all single words or phrases (such as short phrases) that are jargon or specific to a particular field of study. Such jargon/key word marks are indicated at 83 in FIG. 2. Although disclosed as jargon or keyword marks, it should be appreciated that the mark may include sections or portions of an e-book. In some examples, the words and their page location may be used in a relational database linking all the works that have been subjected to TRAC Linking key words is a way of expanding TRAC in the future when a critical number of books have been marked.

Finally, having provided internet links for the HL and editing of these sites, the expert may return the instrument to the development team 84. In the illustrated example, having first "marked" the "e-book" with highlights (HL)— both "critical" and "important", then written comments (both long and short) for each marking, and finally listing internet links (and editing them) followed by indicating "j argon/key words" the work of the expert may be considered completed or done. Specifically, when finished the expert may send his/her work to the development team for final edits and making sure the answers and links conform to the standardization of data. As provided above, the standardization of data may be based on the markings, including number of words, number of links, quality of work, etc.

It should be appreciated that in some systems, a critical number of works may be subject to TRAC annotations and comments. A database 71 may retain the TRAC information and may be used to able to establish statistical, relational, and patterns among and between the works, even across discipline lines. This overall function of the database, may be considered distinct from the use of an individual using TRAC to study and learn about one e-book at a time. Such a database extends beyond one book, and may enable examination of the relationships to other works in the database. Depending on what books are subject to TRAC, portions of the database for some disciplines may be usable first.

In some further examples, the use of the software for corporate development does not preclude the use of the TRAC in a sub-system or micro environment. For example, the illustrated example of corporate development of software does not preclude the use of TRAC technology by an individual (for example a professor) being the "expert" and using TRAC for use by her students. This smaller and less complex use may not be subject to approvals and editing by a development team, and both uses are within the scope of the disclosure.

FIG. 3 provides a further illustration of the appearance of TRAC on a display of a computing device. FIG. 3 further illustrates an example of touchscreen use for TRAC, although such disclosure is non-limiting and other user inputs are considered and are within the scope of the disclosure.

For example, as illustrated, FIG. 3 provides a non-limiting example of a sample e-text page when the touch screen logo is touched turning TRAC on (powering up). The example screen provides a sample text with markings to indicate and differentiate critical text from important text. In this example, the highlights (HL) may appear as two different markings, such as colors or other indicators, highlighting sections of text. In the figure, highlights are indicated by underlining (supportive) and bold (critical). Although described in regards to colored highlights, underlining, such as provided at 90, italics, indicated at 92, different fonts, etc. may all be interchangeable methods of indicating and delineating text.

Each consecutively numbered and highlighted section may be activated by touch screen technology or other suitable user input technology. In this example, touching any highlighted text section may bring up the menu (FIG. 4) which may be partly specific to that section alone, that is, the comments and links may be specific to a particular section of marked text.

In one example, the bold type 90 may be yellow and the underlined text 94 may be highlighted in light blue. The entire text of the work may thus be highlighted and touching any highlighted section may bring up a first menu.

In one use example, the learning theory associated with TRAC may enable readers reading the highlighted sections of the text as a summary, and touching the highlights when they have a question or do not understand what is written. The resulting menu may bring up a choice of expanded learning resources developed to help understand that section of text from commentary to edited net resources. Each highlighted text section may include unique comments and links In some examples, the link to the home page is the same in each, referring to the resources available at the home page (see FIG. 5). As described in more detail herein, the home page menu may allow the user to link to other integrated resources such as the library, a home page, or a listing of consultants appropriate to the text section or whole text.

Figure 4:
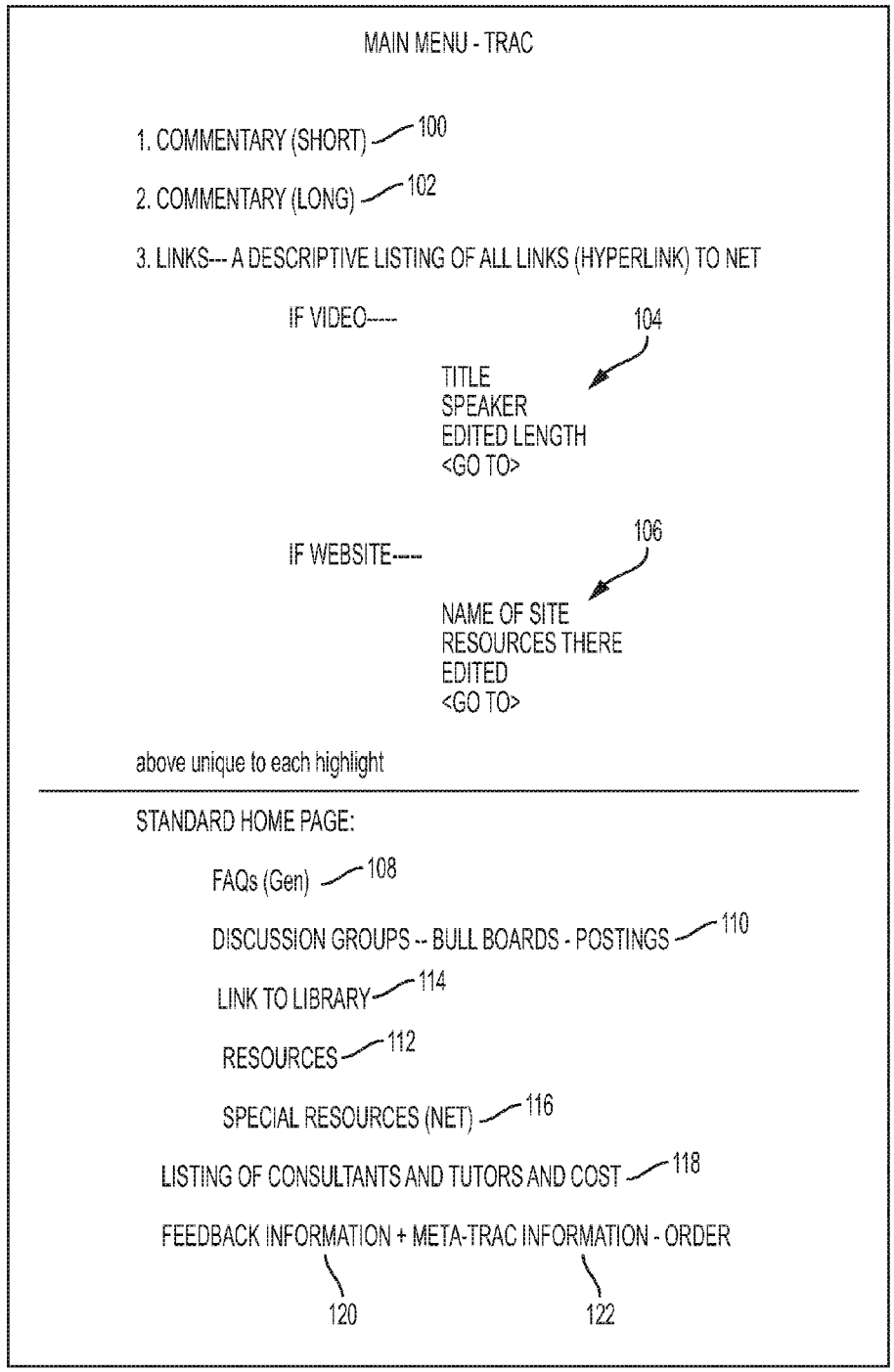
FIG. 4 illustrates an example screen shot of a TRAC menu in accordance with the current disclosure.

Turning now to FIG. 4, an initial TRAC menu of choices is illustrated. Such TRAC menu may be displayed in response to selecting (or touching) a hyperlink—highlight (HL) in the text.

As an illustration, one choice from the TRAC menu of FIG. 4 is to touch (or choose) the short commentary, indicated at 100. This selection may direct or link the user to (hypertext) a display or screen with text that is limited to a short version of commentary related to a highlighted marking.

Touching number 2 (indicated at 102), long commentary, may result in display of a long version of commentary, a variable commentary in terms of length and depth of the commentary. For illustration purposes only, the commentary may be perhaps 500 words or more.

As another selection, a user may select a link, such as a video link, indicated at 104 or a website link, indicated at 106. With such selection, the user may be presented networked videos, such as expert-linked or -edited videos 104 or websites, such as expert-linked or -edited websites 106. For example, the menu may list a short description of the resource that would be called up (hypertext) and how long it will run if appropriate. The user, upon selection, would then see perhaps a relevant 6 minutes of a 45 minute lecture on the subject at hand from internet resources. Similarly, if the resource is a website, when it appears on the screen it may include the same highlighting as the primary text or other markings to direct the user's attention to the relevant material. As a non-limiting example, the website may include one color (or mark) for important sections, and another color (or mark) for supporting and important sections. The viewer thus is able to easily go to the right location and see a scaled down version (reduction). It should be appreciated that these examples are provided for illustration purposes and other links may be provided to non-expert or non-marked videos, websites or other materials.

This TRAC linkage provides an advantage of directed surfing of the networked resources (e.g. the Internet) such that no independent search is necessary avoiding a mistargeted search which may easily get off course. Further, the resources are edited down (reduced) in time and/or content which may be specifically tied to the passage of interest. It is further noted that the TRAC linkage reduces the inefficiencies in leaving an e-reader to go search the networked resources randomly.

Again referring to FIG. 4, the home page may further additional links tied to the e-book or selected section. The links, in some examples, may be maintained by the TRAC developer with one section for each e-book done.

In the illustrated embodiment, the home page links may include FAQS, at 108, discussion groups, at 110, and resource links The discussions groups may be related to the particular e-book or text section. Resources may also be linked, such as indicated at 112, and may include a listing of resources available that have been collected during TRAC development and feedback related to the e-book or text section. This resource list may include papers written and submitted by users of TRAC or comments and suggestions from other users of TRAC in the form of postings on topics of interest.

Similarly, a link may be provided to a library (indicated at 114) or other resources (112). For example, if a particular library is chosen by the TRAC user the direct URL addresses may be available to directly go to reference desks and other resources the library might provide related to the e-book TRAC. Downloadable text from other resources may be available and direct links to any useful parts or sections of the library. In some examples, the special resources, indicated at 116, may include special libraries that might have special resources in the area defined by the TRAC. For example, the special resources may be identified from the development team when the TRAC is finalized, although the expert may be given an opportunity to suggest these also. Moreover, in some examples, other users, a social network and/or social utility group may provide input for such special resources.

The page may further include, in some examples, a link to consultants or other experts. For example, as illustrated at 118, a listing of consultant and tutors and costs may be provided. In some examples, the direct contact list may be maintained or sponsored by paid consultants who work in the area of the TRAC section chosen. The menu may provide links to directly go to their site and purchase more consulting or assistance, if desired.

In some examples, a feedback section in the menu 120 may encourage feedback to help improve TRAC over time. For example, in some embodiments, compensation may be provided for ideas and resources provided that are used in future updates of TRAC.

Finally, in further examples, the TRAC menu may include a META TRAC resource, also referred to as a relational database from a plurality of TRACs. The META TRAC is described in more detail in regards to FIG. 6. Briefly, the META TRAC may include a database capable of linking a plurality of TRAC text by keyword, jargon, discipline, idea, author, etc., allowing for a single user to access TRAC information acquired for a secondary source while in another TRAC book. Access may be determined by the developer and owner of the TRAC system. For example, in some systems, the META TRAC may be enabled to a user requesting full access to the database for an additional fee, and/or use without the purchase of any particular e-book. The TRAC relational database from the integration of TRAC e-books provides a research tool with cross access to the full database.

Figure 5:
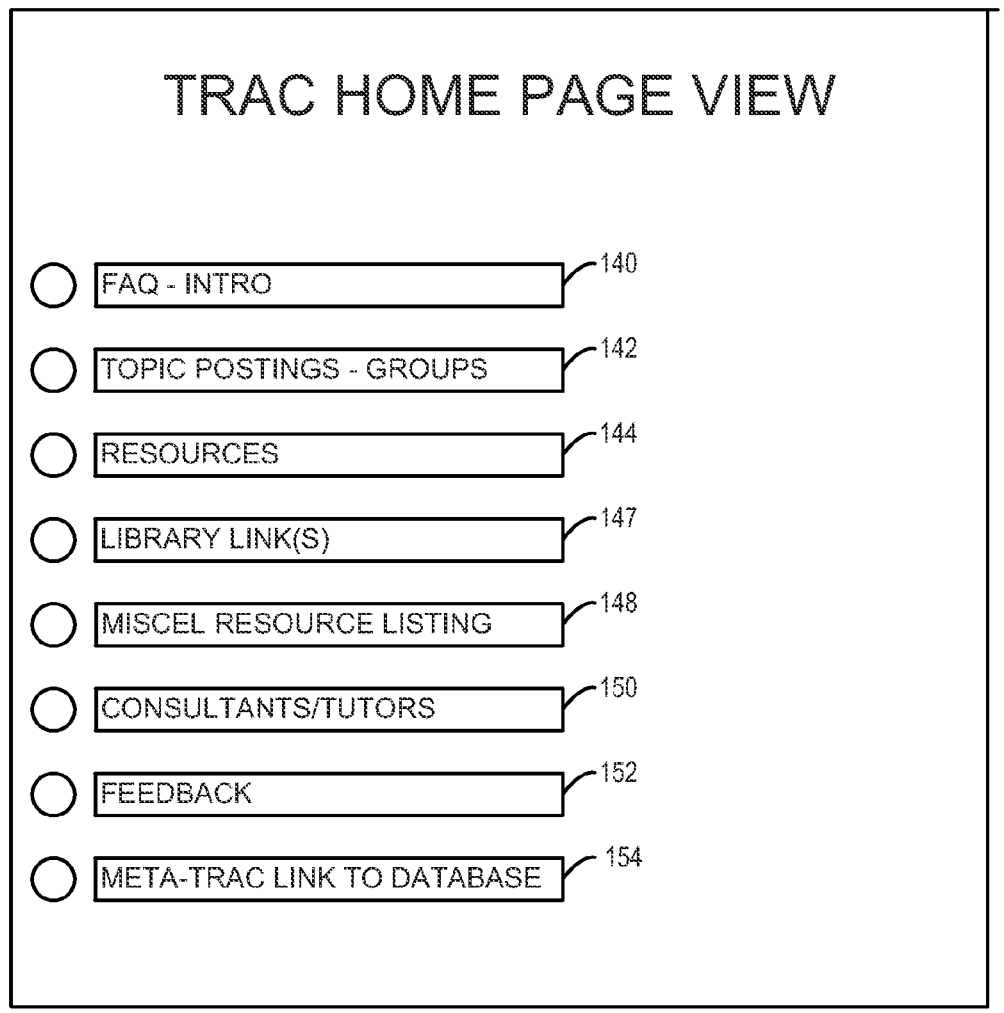
FIG. 5 illustrates an example screen shot of a TRAC home page view in accordance with the current disclosure.

FIG. 5 provides further illustrations for an example TRAC system. Specifically, FIG. 5 provides an example TRAC Home Page View including the links contained within an example Home Page section of the menu. It should be appreciated that in the illustrated example, from the menu, it is possible to go directly to the Home Page maintained for each TRAC book.

As described above, the TRAC Home Page may include, one or more of, a FAQ-INTRO, indicated at 140, a topic postings—groups, indicated at 142, a resources link, at 144, a library link, at 147, a miscel resource listing, at 148, a consultant/tutors links, at 150, a feedback link, at 152 and a META-TRAC link at 154. The topic postings—groups may include discussion groups and bulletin boards for postings on the e-book and issues related to the selected section or e-book. The resources link may provide access or information regarding papers and other resources related to the e-book which may be posted by users, experts or others. The library link may provide a link to a designated library and resources contained relating to the TRAC e-book. A general section for miscellaneous resources and a listing of tutors on-line who consult in the designated area as a business may further be selected by the user. In some examples, a "feedback" section may be selected by a user to make suggestions regarding improvements in the TRAC program and content. Further, similar to the discussion above, a META-TRAC link may be selected so users of TRAC for one book, will have access to related links defined by key word, concept, idea, author, discipline, etc. can be used to search possible links to sections of other TRACs.

Specifically, FIG. 6 provides a method and system for example development of a META-TRAC system. The META-TRAC systems may be considered a combined database of the TRAC system used with many texts (e-books). In this way, it should be understood that the META-TRACK is from "Meta" from Greek meaning from, across, between the individual TRACs. The system thus uses a TRAC database indicating similarities and shared material across e-books using key words/jargon and other search methods.

TRAC collected data allows a new type of "meta-analysis" when a critical number of works have been subjected to TRAC data collection. The critical number of works may vary and the level of the META-TRAC analysis may improve with an increased number of TRAC works generally and in a specific field. Regardless, a META-TRAC may be formed with as little as two TRACs.

As provide above, an expert marking a work as a TRAC has been guided in a standardized information collection instrument so that the pattern of: Reduction (HL)->Expansion (comments, links)->Reduction (edit-comments, links) is developed. The pattern enables a user to choose marked text where more information is needed, and be guided to 'more and more, about less and less'—what is needed is chosen by the reader (user). This is the basis for TRAC methodology.

In one example, META-analysis of TRAC is possible when a large number of books have been subjected to TRAC markings. Since the expert has also been asked to indicate (with a standard marking or indicator) words in the work that are jargon or key words particular to the e-book, these marked individual words allow word counts, statistical analysis of placement, and a relationship between and across works forming a meta-analysis of several types.

For illustration purposes to further illustrate the TRAC method and system, the following example is provided. In the example, a student has been requested to read WALDEN POND for a class and would like an overview in a short period of time.

An Example of Using TRAC with the E-text of the Book WALDEN POND

Walden Pond by Thoreau is often an assigned text in college courses. If a student wanted a quick overview with limited time, and ordered TRAC with the e-text of Walden, the following texts and comments might appear as highlighted text.

The user Sees on Screen Highlighted:

"When I wrote the following pages, or rather the bulk of them, I lived alone, in the woods, a mile from any neighbor, in a house which I had built myself, on the shore of Walden Pond, in Concord, Massachusetts, and earned my living by the labor of my hands only. I lived there two years and two months."

A few pages later the following text might be highlighted in blue, meaning it is important and supportive of critical matter.

The user Sees in Blue Highlight:

"I see young men, my townsmen, whose misfortune it is to have inherited farms, houses, barns, cattle, and farming tools; for these are more easily acquired than got rid of."

These two highlights might well be selected for TRAC inclusion by a Thoreau scholar, being an "expert". Having read these two highlighted passages a reader has a good sense of chapter 1.

If the user touches the first text, in yellow (touch screen) the student may see in regular text on the screen the following short comment:

If "Henry David Thoreau did build a small shack, 10×15 feet in dimension at Walden Pond, on land owned by his friend and fellow author Emerson. The stay was to be a sort of experiment in simplicity, not survivalism. The goal was to see how simply one could live and perhaps have an even fuller live, freed from excessive "things". He walked hours each day observing nature, and kept a journal from which other books were derived. The journal dealt with nature, spirituality (transcendentalism), and observations on the society around him he observed daily."

In some examples, the short comment does include the delineation of key words in bold.

The above example provides an illustration how TRAC may be used if only one book is subjected to the software. In other examples, the key words may come into play and form the database as multiple e-books and e-text documents are "TRACed" and all the information stored in a database, with keywords as one method of access to the whole.

For example, just as the first e-book example above, read on an e-reader was perfectly useful, the first book with TRAC will be useful—for one particular book. As this process continues, the amount of relational information in the TRAC database will grow as the titles using TRAC grow. At a certain point the words in the comments that are bold (and others in the text itself-tagged as bold, or actual bold) allow database searching as a TRAC function.

In the example above, a researcher working on "simplicity" and doing a TRAC search may be able to receive the text from Walden printed out and the comments where "simplicity" actually occurs. A search for "simplicity" would also result in other quotes that were highlighted in a TRAC e-book.

Thus, as a further example, without buying Walden Pond itself, a researcher using the TRAC database may have available many quotes from the book, comments about that text, and even edited links to internet resources which may be highly related.

In other words, TRAC is not database dependent, beyond storing the TRAC information of the latest book completed. However, the TRACs actually build a database over time as numerous works are subjected to the TRAC method and software.

Keyword searches, related to "jargon" searches may be used in the TRAC database. The nature of the data collected means the database itself can be subjected to various types of statistical analysis of content. Techniques are possible that show relationship between works and indicate patterns.

The database may grow in a manner similar to how the net music company Pandora has an ongoing genome program of music types. This kind of typology is also a possibility when the TRAC database reaches a critical level. The "critical numbers" may depend on the type of analysis needed.

FIG. 6 shows that the development of TRAC software leads to the TRAC database 162. Development of TRAC 169, 167, 165, 163, 161 allows the stored information 170 along with key word collection 161 and the database 162 to form a search function 164. In one example, the standardized responses from the expert for the TRACs enables the collection of relational based results which can be integrated and cross-linked with other expert responses to a different TRAC. Linking the TRAC responses results in linkages of sections of one book to sections of other books in related or similar fields. The results would include links to one or more or all of the following: key words (Jargon/key), location (page and title of book), external links (expert linked third party links) and comments (such as from the expert). A search of concepts or key words would result in search results based on one or more of the key words, location within book, links and comments.

For example, the reader of one book can be lead to links to other works by a word search in the entire TRAC database. Or, a researcher might list and determine various works across discipline dealing with the same subject in different ways by using the database to find these links No other current computerized system or method can do this type of analysis.

In other words, a Relational Database can indicate how the growing number of text works (e-books, papers, journal articles, reports, etc), containing standardized TRAC information along with the "Jargon/key word" form a unique search function. This information is maintained in a database 162 that may be searched in a number of ways, including the jargon words and any other key word or by discipline, or author, or any other similar search method.

As described above the Meta TRAC database information may be part of the TRAC homepage 164 and available to users for writing, research, or learning purposes. The database provides a source of information about all the works having been subjected to the TRAC methodology.

The TRAC database thus allows the linking of many other works to be searched for related information specified in any particular TRAC work. Further, in some examples, an independent search may be possible to link the various works amassed based on some key concept or area of interest without owning the e-text or TRAC for any particular book. The database may bring up all the TRAC information (work, page, comments, edited links) and may searchable from keywords or other means, making it a unique database within e-book technology.

As a further example, in the corporate software embodiment, the database provides a research system based on a relational database with search capabilities. Links between TRAC information in multiple sources are established.

Thus, as described above, systems and methods have been described in regards to text reduction with annotation and commentary and a relational database. In one example, a method of electronically providing a text reduction with annotation and commentary is provided including sending an annotation request to an expert, wherein the expert is a selected from a pre-defined group, and where the annotation request is a template comprising tasks for making an expert annotation. The method includes receiving the expert annotation of at least a portion of an electronic written work from the expert, where the expert annotation includes at least one marking within the written work to differentiate critical material. The method further includes displaying through a networked computing device the expert annotation to a user upon selection of the at least a portion of an electronic written work.

In some examples, the method further includes creating a relationship linkage between the electronic written work and the expert annotation in a reference database.

Further, in some examples, the marking within the written work may include one or more of targeted commentary to the portion of the written work and links to related associated materials. Moreover, in even further examples, receiving an expert annotation includes automatically creating reference linkages to a research reference based on each marking in the written work. The method may further include edited links to associated materials with edits based on at least one of time and content and/or receiving at least one of a short commentary in accordance with pre-set parameters for the portion of the written work and a long commentary in accordance with pre-set parameters for the portion of the written work.

In other embodiments, the method may include displaying discussion groups, library links, resources and/or listing of consultant and tutors based on the selected portion of the written work. Further, in some examples, the method may include receiving a selection of a preferred research collection, such as a library; associating references within the preferred research collection with the expert annotation, and displaying the references associated with the expert annotation for the preferred research collection.

As a further example, a method is disclosed for creating an annotation database. The method may include receiving an expert annotation of a selected portion of a written work from an expert including a jargon/keyword identification, and including at least one marking; creating a work selection relationship linkage between the selected written work and the expert annotation; creating an associated material relationship linkage based on the expert annotation; matching the associated material relationship linkage with a second material relationship linkage based on the jargon/keyword identification; and displaying results of the matching of the material relationship linkages. In some examples, the method may include, receiving approval of the expert annotation from a development team.

In some examples, the method may include displaying one or more of the jargon/keyword identification, a location of the selection portion of the written work, links associated with the selection portion of the written work and comments related to the selection portion of the written work. The links may be associated with the selection portion of the written work include markings from an expert related to the selected portion of the written work. In some examples, the links may be edited video links, edited for one of time and related content and/or the links may be edited website links, edited for one of time and related content. Further, displaying results may include matching of the material relationship linkages including displaying targeted commentary to the selected portion of the written work.

In even further examples, a system may be provided for a text reduction with annotation and commentary, where the system includes a networked computing device having a processor, a memory device and a user interface, the computing being configured to run a plurality of modules; an expert annotation module configured to run on the processor and to receive an expert annotation for a portion of an electronic written work including at least one marking; an association module configured to run on the processor and associate the at least one marking with the portion of an electronic written work and store the electronic marking in association with the portion of an electronic written work in an associated database; and a display module configured to output a display to a user computing device a report of the expert annotation in response to a user selection of a portion of an electronic written work. In some examples, the expert annotation module further may include a commentary module to receive targeted commentary from the pre-select group of experts for the portion of the electronic written work and where the display module is configured to output a display to a user computing device including the targeted commentary.

In even more examples, a key word module may be provided to receive key words as part of the expert annotation for the portion of the electronic written work. Moreover, the key words may be stored in a relationship association with the portion of an electronic written work in the associated database. Further, in some examples, a search module matching the key words from the associated database with a second electronic written work based on the relationship association may be provided. The display module may be further configured to display search results from the search module based on the relationship association.

It will be appreciated that each of the computing devices described above with regard to the description and figures may include code stored in memory executable by a processor configured to implement various instructions such as the methods, processes, etc., described herein. Each of the modules may be stored on one or more networked or linked computing devices. The memory includes storage devices with one or more of the following characteristics: volatile, nonvolatile, dynamic, static, read/write, read-only, random access, sequential access, location addressable, file addressable, and content addressable. In some embodiments, the memory and the processor may be integrated into one or more common devices, such as an application specific integrated circuit or a system on a chip. Example computing devices include desktop computing devices and mobile computing devices (e.g., smartphones, tablets, laptops, etc.). Further it will be appreciated that the computing device may include displays for presenting graphical data described above.

It will be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A method of electronically providing a text reduction with annotation and commentary, the method comprising:
   selecting a reviewer from a predefined group;
   providing an annotation template to the reviewer and where the annotation template comprises template tasks comprising one or more text highlighting tasks, one or more text commenting tasks, and one or more hyperlink editing tasks for the reviewer to complete;
   wherein each text highlighting task comprises highlighting a respective portion of text in an electronic written work identifying the respective portion of text as corresponding to at least one of a particular text commenting task or a particular hyperlink editing task, wherein each commenting task comprises creating a first commentary and a second commentary, the first commentary have a length greater than a predetermined threshold and the second commentary having a length less than the predetermined threshold, and wherein each hyperlink editing task comprises inserting one or more hyperlinks selected from the group consisting of: a link to a designated on-line lending library, a discussion group, a resource link, and a listing of consultants;

receiving the annotation template from the reviewer, wherein each task of the annotation template is completed prior to the receiving;

linking each completed template task of the completed template tasks in the annotation template with the respective portion of the text based on the received highlighting tasks;

receiving a selection by a user of at least of a portion of the text; and displaying through a networked computing device the linked and completed template tasks to a user based upon the selection.

2. The method of claim 1, further comprising storing the linked and completed template tasks in a reference database.

3. The method of claim 1, where the completed template tasks comprise a plurality of edited links to on-line associated materials with edits based on at least one of time and content.

4. The method of claim 1, wherein receiving the annotation template with completed template tasks comprises automatically creating reference links to reference material associated with the electronic written work based on one or more of the completed template tasks.

5. The method of claim 1, further comprising receiving approval of the completed template tasks from a development team comprising one or more persons whom are permitted to edit the completed template tasks.

6. The method of claim 1, wherein links associated with the portion of the text comprise markings from the reviewer related to the portion of the text.

7. The method of claim 1, wherein the links comprise at least one edited video link.

8. The method of claim 1, wherein the links comprise at least one edited website link.

9. The method of claim 1, wherein displaying the linked and completed template tasks comprises displaying one or more of a menu item, a location of the portion of the text, links associated with the portion of the text, and comments related to the portion of the text.

10. The method of claim 1, wherein displaying the linked and completed template tasks comprises displaying commentary related to the portion of the text.

11. The method of claim 1, where the portion of the text selected by the user corresponds to one or more of the linked and completed template tasks and where the linked and completed template tasks are displayed in a graphical menu.

12. A system for a text reduction with annotation and commentary, the system comprising:

a networked computing device having a processor, a memory device and a user interface, the computing device being configured to:

send an annotation template to a reviewer, wherein the reviewer is selected from a pre-defined group, and where the annotation template comprises template tasks comprising one or more text highlighting tasks, one or more text commenting tasks, and one or more hyperlink editing tasks for the reviewer to complete;

wherein each text highlighting task comprises highlighting a respective portion of text in an electronic written work identifying the respective portion of text as corresponding to at least one of a particular text commenting task or a particular hyperlink editing task, wherein each commenting task comprises creating a first commentary and a second commentary, the first commentary have a length greater than a predetermined threshold and the second commentary having a length less than the predetermined threshold, and wherein each hyperlink editing task comprises inserting one or more hyperlinks selected from the group consisting of: a link to a designated on-line lending library, a discussion group, a resource link, and a listing of consultants;

receive the annotation template from the reviewer, wherein each task of the annotation template is completed prior to the receiving;

link each completed template task of the completed template tasks in the annotation template with the respective portion of the text based on the received highlighting tasks;

store the completed template tasks and links in an associated database;

receive a selection by a user of at least of a portion of the text, and;

display on a user computing device the linked and completed template tasks based upon the selection.

13. The system of claim 12, wherein the networked computing device is further configured to receive completed template tasks from a second reviewer and send the completed tasks to the user computing device for display.

14. The system of claim 12, further comprising a key word module receiving menu items as part of the completed template task.

15. The system of claim 14, further comprising storing the menu items in a relationship association with the portion of the text in the associated database.

16. The system of claim 15, where the networked computing device is further configured to match the menu items from the associated database with a second electronic written work based on the relationship association.

17. The system of claim 16, where the networked computing device is further configured to generate search results based on the relationship association.

* * * * *